United States Patent
Ettischer

[15] 3,690,236
[45] Sept. 12, 1972

[54] SYNCHRONIZING MECHANISM FOR PHOTOGRAPHIC CAMERAS ADAPTED TO USE MECHANICALLY FIRED FLASH LAMPS

[72] Inventor: Helmut Ettischer, Stuttgart-Wagen, Germany
[73] Assignee: Eastman Kodak Company, Rochester, N.Y.
[22] Filed: Aug. 19, 1970
[21] Appl. No.: 65,034

[52] U.S. Cl. ..................................95/11.5, 95/42
[51] Int. Cl. ...........................................G03b 15/04
[58] Field of Search ...........................95/11.5 R, 42

[56] References Cited

UNITED STATES PATENTS

| | | | |
|---|---|---|---|
| 2,322,734 | 6/1943 | Steiner | 95/42 |
| 2,550,698 | 5/1951 | King et al. | 95/42 |
| 3,584,550 | 6/1971 | Malone et al. | 95/11.5 R X |
| 2,956,490 | 10/1960 | Staudt | 95/42 X |
| 3,254,584 | 6/1966 | Okajima | 95/42 |
| 3,584,551 | 6/1971 | Dierks et al. | 95/11.5 R X |

Primary Examiner—Samuel S. Matthews
Assistant Examiner—Michael L. Gellner
Attorney—Robert W. Hampton and Leonard W. Treash, Jr.

[57] ABSTRACT

A photographic camera is provided with a three-legged member which rotates rapidly upon release to synchronize several or all of the following operations:
  a. initiation of automatic exposure control functioning;
  b. actuation of the camera shutter;
  c. displacement of the viewer mirror (single lens reflex cameras) from the camera's optical path; and
  d. actuation of a percussively ignitable flashlamp.

The three-legged member is energized prior to picture-taking and release is accomplished when the camera user depresses or otherwise actuates the camera release member.

2 Claims, 6 Drawing Figures

HELMUT ETTISCHER
INVENTOR

ATTORNEYS

HELMUT ETTISCHER
INVENTOR

BY Leonard... (illegible)
Robert W. Hampton

ATTORNEYS

PATENTED SEP 12 1972  3,690,236

HELMUT ETTISCHER
INVENTOR

BY *Leonard W. Treash Jr*
*Robert W. Hampton*
ATTORNEYS

SYNCHRONIZING MECHANISM FOR PHOTOGRAPHIC CAMERAS ADAPTED TO USE MECHANICALLY FIRED FLASH LAMPS

CROSS-REFERENCE TO RELATED APPLICATION

Reference is made to commonly assigned U.S. application Ser. No. 765,926, now U.S. Pat. No. 3,576,155 entitled "Percussion Activatable Flash Units Having Individual Striker Elements and Photographic Apparatus for Using Such Units" filed Oct. 8, 1968, in the name of David E. Beach and copending U.S. application Ser. No. 10,068 filed Feb. 12, 1970, entitled PHOTOGRAPHIC APPARATUS, David N. Brooks.

BACKGROUND OF THE INVENTION

1. Field of the Invention

The present invention relates to photographic cameras and camera mechanisms usable with mechanically ignitable flash lamps and more particularly to mechanisms for synchronizing essential picture-taking operations with the actuation of mechanically ignitable flash lamps, for example, percussively ignitable flash lamps.

2. Description of the Prior Art

It is well known in the photographic art to use electrically fired flash devices to supplement the natural light available for picture taking. While electrically fired flash devices have provided generally satisfactory results it has proven difficult to design firing systems which have the high reliability desirable in this application.

The batteries which typically serve as the power source in electrical flash firing systems deteriorate with age and use reducing their effectiveness in initiating flash operation. The contact surfaces of the electrical circuit are subject to corrosion which further serves to render the firing system less dependable. The exasperating quality of a flash failure because of either or a combination of the above causes is accentuated when the failure occurs for a "once in a lifetime" picture taking opportunity. In order to maintain a user's satisfaction with his camera, it is desirable that the likelihood of such flash failures be minimized.

To obviate the need for electrical power sources and circuits and to provide for more dependable flash photography, percussively ignitable flash lamps have been developed.

One such lamp is disclosed in U.S. application Ser. No. 765,926 entitled PERCUSSION ACTIVATABLE FLASH UNITS HAVING INDIVIDUAL STRIKER ELEMENTS AND PHOTOGRAPHIC APPARATUS FOR USING SUCH UNITS filed Oct. 8, 1968, in the name of David E. Beach, and now U.S. Pat No. 3,576,166.

In this application a percussively ignitable flash lamp is disclosed that can be assembled in a unit with a percussion striker which is held in a pre-energized condition by a latch member releasable to effect ignition of the lamp.

A multilamp flash unit of a similar type is described below wherein percussively ignitable flash lamps are supported so as to be fireable by pre-energized spring striker members. Actuation of the flash unit is accomplished when an actuating bar or probe enters a striker access opening for the lamp in firing position engaging and dislodging the striker member.

In U.S. Pat. No. 2,972,937 (Suits) it is suggested that a flash lamp can be ignited by piezo-electrical actuation, that is, by striking a piezo electrical element located either in the camera or the flash lamp unit and electrically connected to the lamp.

To take advantage of the new flash units which are fireable by mechanical rather than electrical means, new camera mechanisms must be developed capable of providing the appropriate mechanical actuation in properly timed relationship to other essential film exposing operations.

U.S. application Ser. No. 10,068 filed Feb. 12, 1970, entitled PHOTOGRAPHIC APPARATUS, filed in the name of David N. Brooks, discloses a spring energized driver, released for movement through a path supplying the energy for firing a percussive lamp and releasing a shutter driver in timed relation.

Although such a mechanism is acceptable for relatively simple cameras, with more complex cameras such as single lens reflex cameras, further functions must be accomplished.

For example, it is widely known to use central opening shutters having a control shaft which extends externally to the shutter housing to permit synchronization of the shutter with other camera devices. A shutter mechanism including such a control shaft is described in German Pat. No. 1,115,574. When the viewing mirror of a single lens reflex camera must be moved and a flash actuated mechanically, the synchronization problems multiply.

SUMMARY OF THE INVENTION

The present invention provides a camera with a preenergized rotatable synchronizing member which moves rapidly upon release through an operative path to serve in coordinating known film exposing operations and actuation of a flash device employing mechanically ignitable flash lamps.

According to a preferred embodiment of the invention, a multi-legged rotating pre-energized synchronizing member coordinates the more numerous film exposing operations encountered with sophisticated cameras such as shutter actuation, mirror movement and exposure control in single lens reflex cameras.

BRIEF DESCRIPTION OF THE DRAWING

The following figures are referred to in the detailed description of the presently preferred embodiment of the invention.

DESCRIPTION OF THE PREFERRED EMBODIMENT

Because photographic cameras are well known, the present description will be directed in particular to elements forming part of, or cooperating more directly with, apparatus in accordance with the present invention. It is to be understood that camera elements not specifically shown or described may take various forms well known to those skilled in the art.

Referring to FIGS. 1–4, a portion of a single lens reflex camera is shown. The camera includes a principal optical path shown schematically in FIGS. 1–3 as partially defined by a shutter 2. Across the principal optical path is a movable mirror 20 for reflecting light to a viewfinder pentaprism 12. A flashcube socket 4a is positioned to receive a flashcube actuatable by structure more fully described below.

Figure 1:
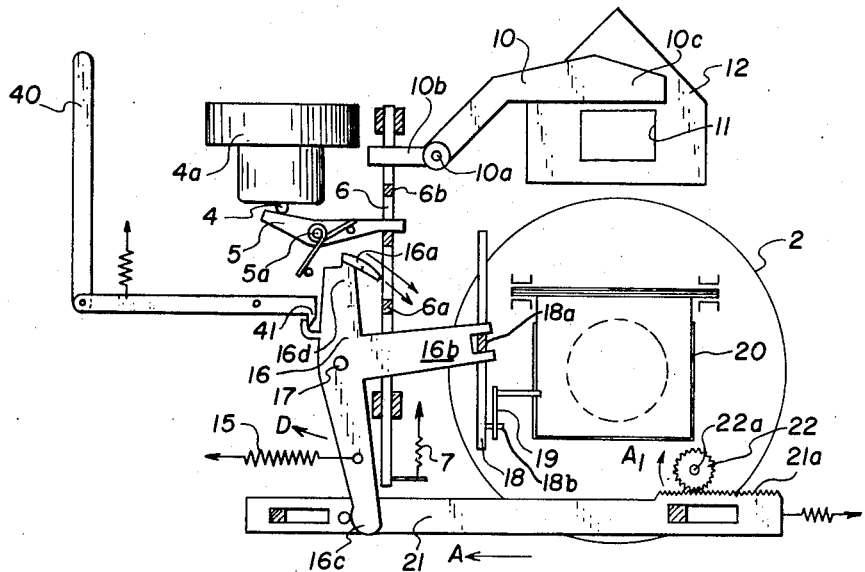
FIG. 1 is a front elevational view of a camera with portions removed to illustrate the present invention and the camera mechanisms with which it interacts. The camera elements are shown in the cocked ready-to-operate position for the condition where no flash unit is mounted.

Referring to FIG. 1, the camera is shown without a flash unit in the socket but in a cocked and ready for use condition. Upon depression of a camera release member 40, a rotatable spider member 16 having three arms, 16b, 16c and 16d, is released by a latch 41 and rotates rapidly about a pivot point 17 in the direction of an arrow D under the urging of a tension spring 15. The rotation of three-armed spider member 16 is transmitted to a mirror latch 18 by arm 16b which includes a recess in which a pin 18a of mirror latch 18 rides. Mirror latch 18 is slidably mounted to move in a vertical path and operative rotation of arm 16b is translated into a downward motion of mirror latch 18. A mirror latch pin 18b while in a pre-operative position engages a latch arm 19 which is rigidly attached to the spring biased mirror 20. With latch arm 19 restrained by latch pin 18b mirror 20 is maintained in viewing position wherein the camera operator is enabled to view the scene to be recorded in the viewfinder 12 through a window 11 and an eyepiece 13 (shown in FIG. 4).

At a pre-selected rotation of three-armed lever 16, mirror latch 18 is translated sufficiently for latch pin 18b to move beyond latch arm 19. With latch pin 18b no longer engaging latch arm 19, spring biased mirror 20 is free to flip to the exposure position (illustrated in FIG. 3).

Rotation of three-armed spider member 16 is further transmitted to a rack bar 21 by means of arm 16c. Rack bar 21 is slidably mounted to move in a horizontal path and is driven in a picture taking direction A by a horizontal force component transmitted to a rack bar pin 21a through engagement with arm 16c. A pinion 22 engages a toothed portion 21a of bar 21 and is fastened to rotate with a control shaft 22a. Operative horizontal movement of rack bar 21 is thus translated by pinion 22 into a rotation of control shaft 22a. Initial rotary motion of control shaft 22a causes an automatic diaphragm (not shown) of the objective lens to be adjusted to the exposure value determined by an exposure control device sensitive to scene illumination as is common in single lens reflex cameras. At the end of this motion control shaft 22a releases pretensioned shutter 2 to effect film exposure. During a camera operation performed without a flash unit mounted on the camera, the third lever arm 16d which effects actuation of the photoflash unit as described below has no role in the exposure sequence.

Figure 5:
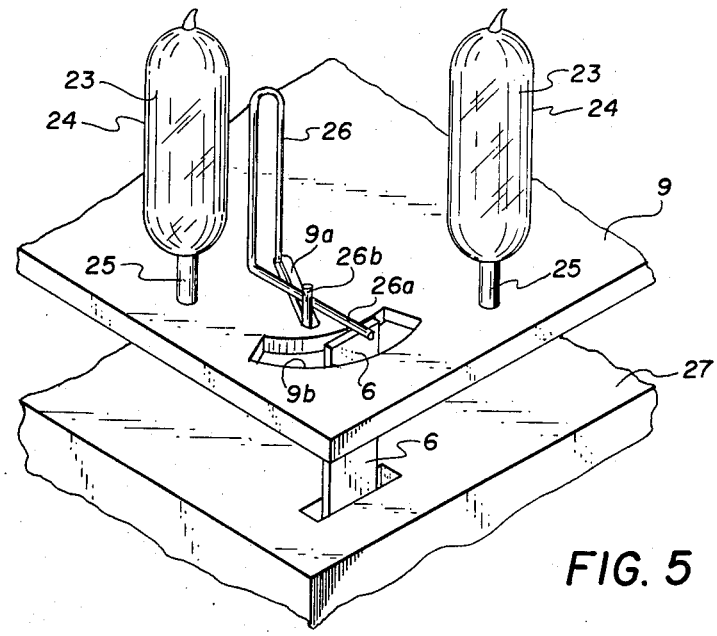
FIG. 5 is a perspective view of a multilamp flash unit utilizing percussively ignitable flash lamps illustrating the elements in their positions prior to actuation. Portions have been removed to illustrate more clearly the position of those elements related to the present invention.

After use the synchronizing member 16 may be cocked by manual movement of rack 21, for example, through a drive train connected to a film wind mechanism, not shown, to rotate the synchronizing member in a counterclockwise direction until engaged and retained by latch 41. Referring to FIG. 5, a flash unit suitable for use with the present invention is illustrated. Flashbulbs 23 consist of a transparent envelope 24 containing the combustible flash material and a combustion promoting gas connecting with an ignition pin 25 which projects from the bottom of the bulb and is ignitable by percussion impact. The ignition pin 25 could be replaced by a piezo electrical element electrically connected to the lamp, but also actuable by striking.

Several of these flashbulbs 23 are shown embedded in a base 9 to form a flash unit. Each flashbulb 23 is associated with a spring striker element 26 which is retained in a groove 9a of base 9 and which is pre-energized by torsion in such a manner that one of its ends 26a is located behind the other end 26b. Spring end 26a extends approximately parallel to the surface of base 9 and projects beyond an access opening 9b which is provided at an appropriate position in base 9 with respect to ignition pin 25. The unit is actuated when an ignition slide bar 6 or probe dislodges end 26a from behind end 26b and the stored spring energy causes end 26a to move sharply against ignition pin 25.

Figure 2:
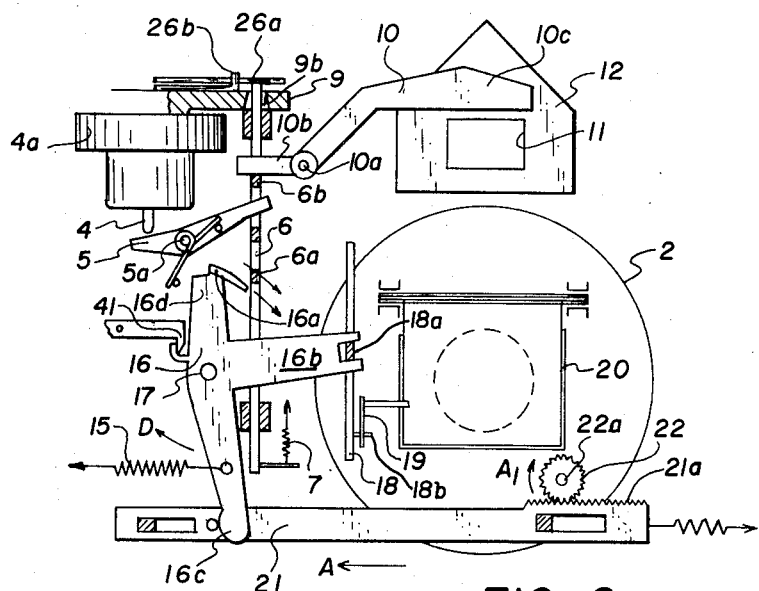
FIG. 2 corresponds to FIG. 1 but illustrates the position of the camera elements for the condition wherein a flash unit is mounted.

Referring to FIG. 2 a flashcube has been inserted into flashcube socket 4a and a pin 4 which is associated with the flashcube socket is forced downwardly driving against one end of a pivoted holding lever 5 which rocks in a counterclockwise direction against a spring bias. Holding lever 5 is thus withdrawn from restraining engagement with a pin 6c of slide bar 6. Ignition slide bar 6 is then free to move upwardly under the urging of a relatively weak spring 7 until the upper end of ignition slide bar 6 engages but does not dislodge spring striker end 26a. In the course of this movement, a cam follower 6a of ignition slide bar 6 is moved into the path of a cam element 16a disposed at the end of lever arm 16d. Ignition slide bar 6 is thus positioned to play an operative role in the exposure sequence.

Figure 3:
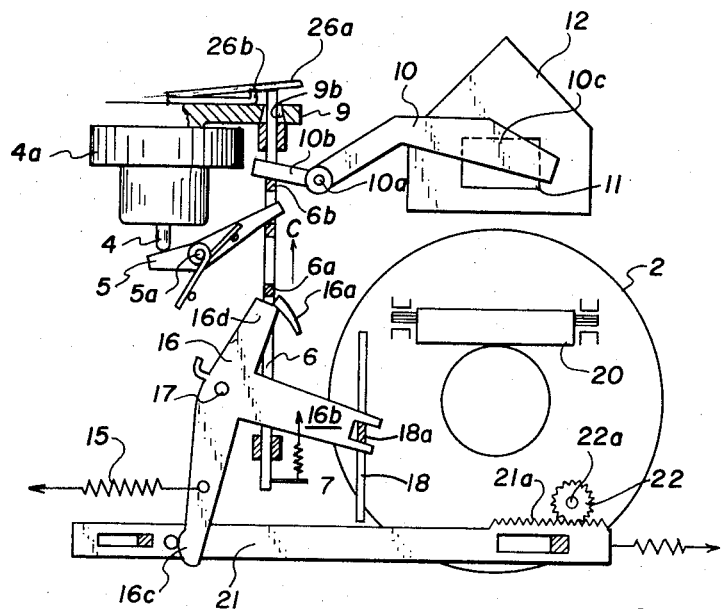
FIG. 3 corresponds to FIG. 2 but illustrates the position of the camera elements with a picture taking sequence partially completed.

Upon actuation of the camera release member, operation of the camera is effected in the same manner as described with reference to FIG. 1; the only difference being that during the pivotal motion of three-armed spider member 16 ignition slide bar or probe 6 is pushed upwardly in the direction of arrow C by the action of cam element 16a engaging cam follower 6a, (as shown in FIG. 3). Slide bar 6 drives end 26a of spring striker element 26 which is lifted over or dislodged from end 26b and stored spring energy causes end 26a to move sharply against ignition pin 25 actuating flashbulb 24. Rapid movement of three-armed spider member 16 assures that percussion firing of the flashbulb takes place in synchronization with shutter action.

Figure 4:
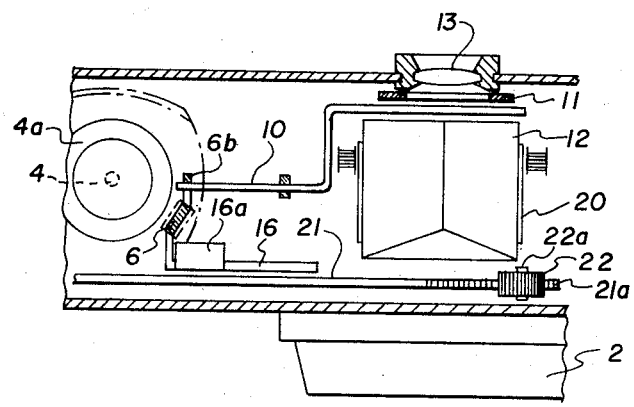
FIG. 4 is a plan view of a camera with portions removed for clarity in illustrating the present invention.

Referring to FIGS. 1 and 4, the user in composing his picture, views the scene via an optical path through eyepiece 13, window 11, pentaprism 12 to mirror 20 and the objective lens (not shown). Without a flash unit mounted, a signal lever 10 remains in a spring biased position (as shown in FIG. 1) not visible to the camera user.

Figure 6:
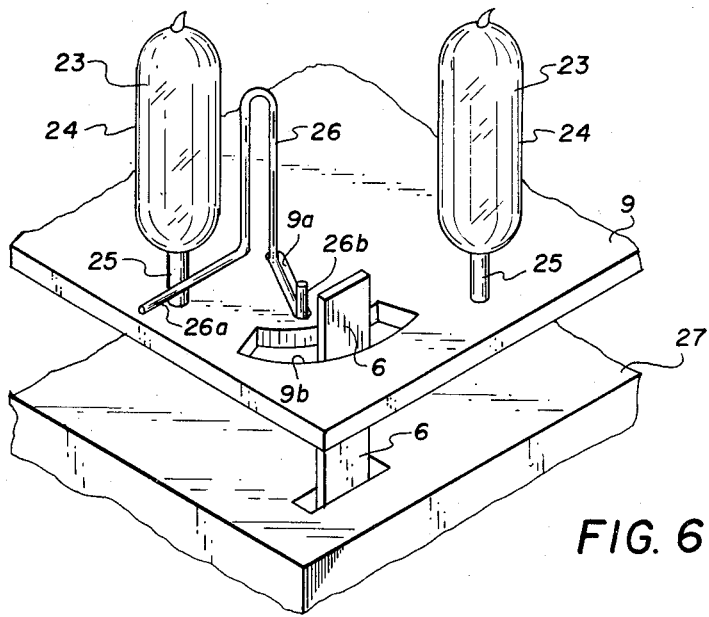
FIG. 6 corresponds to FIG. 5 but illustrates the position of the elements at the time of flash lamp ignition.

With a flash unit mounted, pin 4 is driven against spring biased holding lever 5 which rocks to the flash position illustrated in FIG. 2. In this condition lever 5 no longer engages ignition slide bar 6 which is then free to move upwardly under the urging of spring 7. Upward movement of slide bar 6 is arrested by engaging spring end 26a (as shown in FIG. 5) and signal lever 10 remains in the normal position. For the condition wherein a used flash lamp is in the firing position, spring end 26a is located adjacent to the flash lamp (illustrated in FIG. 6) and does not engage slide bar 6. For this condition slide bar 6 is free to move upwardly until pin 6b engages signal lever 10. Force from spring 7 is transmitted to a control arm 10b of signal lever 10 by a pin 6b of slide bar 6 causing signal lever 10 to rock about a pivot 10a. Signal lever 10 thus urged by spring 7 rocks to signal position (illustrated in FIG. 3) wherein signal end 10c moves into the user's viewing path and is thus visible through window 11 to indicate the condition of the flash lamp to the user.

The invention has been described in detail with particular reference to a preferred embodiment thereof, but it will be understood that variations and modifications can be effected within the spirit and scope of the invention.

I claim:

1. In a camera having a principal optical path, a shutter, a mirror movable between an exposure position out of said optical path and a viewing position in said optical path and a camera release lever actuatable for initiating a camera picture-taking operation, the improvement comprising:

means on said camera for releasably receiving a mechanically actuable flash unit;

a synchronizing member rotatably mounted in said camera and having first, second and third surfaces;

means for rotating said synchronizing member in response to actuation of said camera release lever;

means located for cooperation with said first surface during rotation of said synchronizing member for actuating a flash unit received in said receiving means;

means located for cooperation with said second surface during rotation of said synchronizing member for moving said mirror from said viewing position to said exposure position; and means located for cooperation with said third surface during rotation of said synchronizing member for actuating said shutter.

2. The invention defined in claim 1 wherein said flash unit actuating means is movable to a first position for cooperating with said synchronizing member from a second position out of cooperative relation with said synchronizing member in response to insertion of a flash unit in said receiving means.

* * * * *